US012132627B1

(12) United States Patent
Zhu et al.

(10) Patent No.: US 12,132,627 B1
(45) Date of Patent: Oct. 29, 2024

(54) MACHINE LEARNING MODEL FOR ASSESSING NETWORK PERFORMANCE

(71) Applicant: T-Mobile USA, Inc., Bellevue, WA (US)

(72) Inventors: Yinjun Zhu, Sammamish, WA (US); Jan Olav Opedal, Ellensburg, WA (US); Suchit Satpathy, Hackettstown, NJ (US); Srikrishna Srinivasan, Sammamish, WA (US); Yanbing Su, Frisco, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/365,814

(22) Filed: Aug. 4, 2023

(51) Int. Cl.
*G06F 15/173* (2006.01)
*H04L 41/16* (2022.01)
*H04L 43/06* (2022.01)
*H04L 43/08* (2022.01)
*H04L 65/1016* (2022.01)

(52) U.S. Cl.
CPC .............. *H04L 43/08* (2013.01); *H04L 41/16* (2013.01); *H04L 43/06* (2013.01); *H04L 65/1016* (2013.01)

(58) Field of Classification Search
CPC ......... H04L 43/08; H04L 41/16; H04L 43/06; H04L 65/1016
See application file for complete search history.

(56) References Cited

U.S. PATENT DOCUMENTS

| 11,991,059 B1* | 5/2024 | Gambhir | H04L 43/091 |
| 2022/0051382 A1* | 2/2022 | Chen | H04N 21/4662 |
| 2023/0259363 A1* | 8/2023 | Zahn | G06N 3/088 |
| | | | 703/12 |

\* cited by examiner

*Primary Examiner* — John B Walsh
(74) *Attorney, Agent, or Firm* — Perkins Coie LLP (57) ABSTRACT

A network assessment system for generating subjective quality ratings for Internet protocol multimedia subsystem (IMS) data sessions in real-time. The system measures real-time telecommunications network data during an IMS data session, processes the data using a trained model, and receives a subjective quality rating usable to modify the performance of a node in instances where the node does not typically have an associated subjective quality rating or in instances where the node is not associated with a standardized subjective quality rating.

20 Claims, 7 Drawing Sheets

MACHINE LEARNING MODEL FOR ASSESSING NETWORK PERFORMANCE

BACKGROUND

Quality of experience (QoE) is a measure of the delight or annoyance of a customer's experiences with a service (e.g., web browsing, phone call, TV broadcast). QoE focuses on the entire service experience; it is a holistic concept, similar to the field of user experience, but with its roots in telecommunication. QoE is an emerging multidisciplinary field based on social psychology, cognitive science, economics, and engineering science, focused on understanding overall human quality requirements.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In telecommunications networks that facilitate Internet Protocol Multimedia Subsystem (IMS) data sessions, quality scores are often generated to assess quality of experience (QoE) for these data sessions. Various types of quality scores are generated depending on the element that is measuring the quality score and the purpose for which the quality score is used, including, for example, mean opinion score (MOS) or reference signal received quality (RSRQ). However, the current techniques for generating these quality scores are inflexible and slow because they are typically measured based on user feedback about the overall quality of a data session that is provided after the data session has ended.

To solve these problems, the inventors have conceived of and reduced to practice methods and systems for flexible assessment of IMS data session quality. According to implementations herein, a system receives telecommunications network data that is collected in real-time during an IMS data session. The telecommunications network data can be measured by a network element in a telecommunications network at each of a plurality of measurement intervals during the data session. The telecommunications network data is input to a trained model that generates, as output, a subjective quality rating for each of the plurality of measurement intervals. The output from the trained model can be aggregated and a performance score representing the aggregate can be generated. An attribute of the telecommunications network can be modified based on the subjective quality ratings or performance score.

As one example, techniques described herein enable a system to generate a quality metric for network elements with corresponding Transaction Detail Records (TDRs) or Call Detail Records (CDRs) that do not have quality metrics already associated. In a typical mobile operational network, there are many network entities participating. Furthermore, the IMS data can go through multiple network entities. According to implementations herein, a trained model can monitor ongoing or past telecommunications network data during an IMS data session. For some or all nodes in the network that handle the data session, the model can generate a quality assessment that can be used to improve network quality further. Such techniques can align the method of quality score measurements end-to-end with the same level of accuracy across the telecommunications network, thus providing granular, uniform quality data that can be used to better detect network performance issues.

Some implementations described herein facilitate assessment of the quality of a data session in real-time during the data session. Similarly, the techniques described herein enable a system to generate quality assessments based on data collected during each of a plurality of measurement intervals during a data session. Such quality assessments can better reflect dynamic or transient processes that occur during a data session but that may not be reflected in an overall quality score for the data session.

Implementations herein can also enable a telecommunications network to generate an overall assessment of the quality of an IMS data session. By calculating the quality ratings on the network side, the system can uniquely adapt to different scenarios presented.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
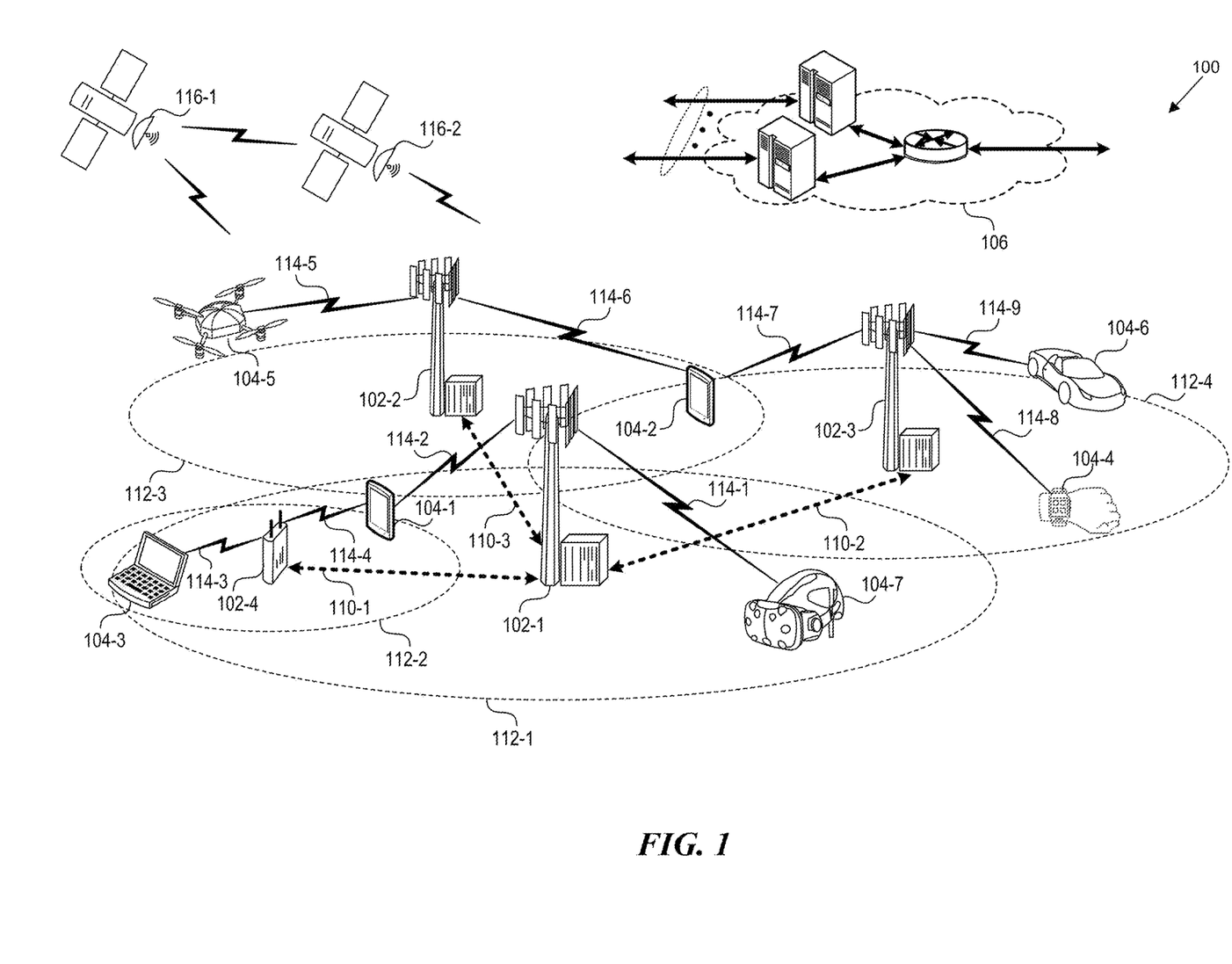
FIG. 1 is a block diagram that illustrates a wireless communications system that can implement aspects of the present technology.

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
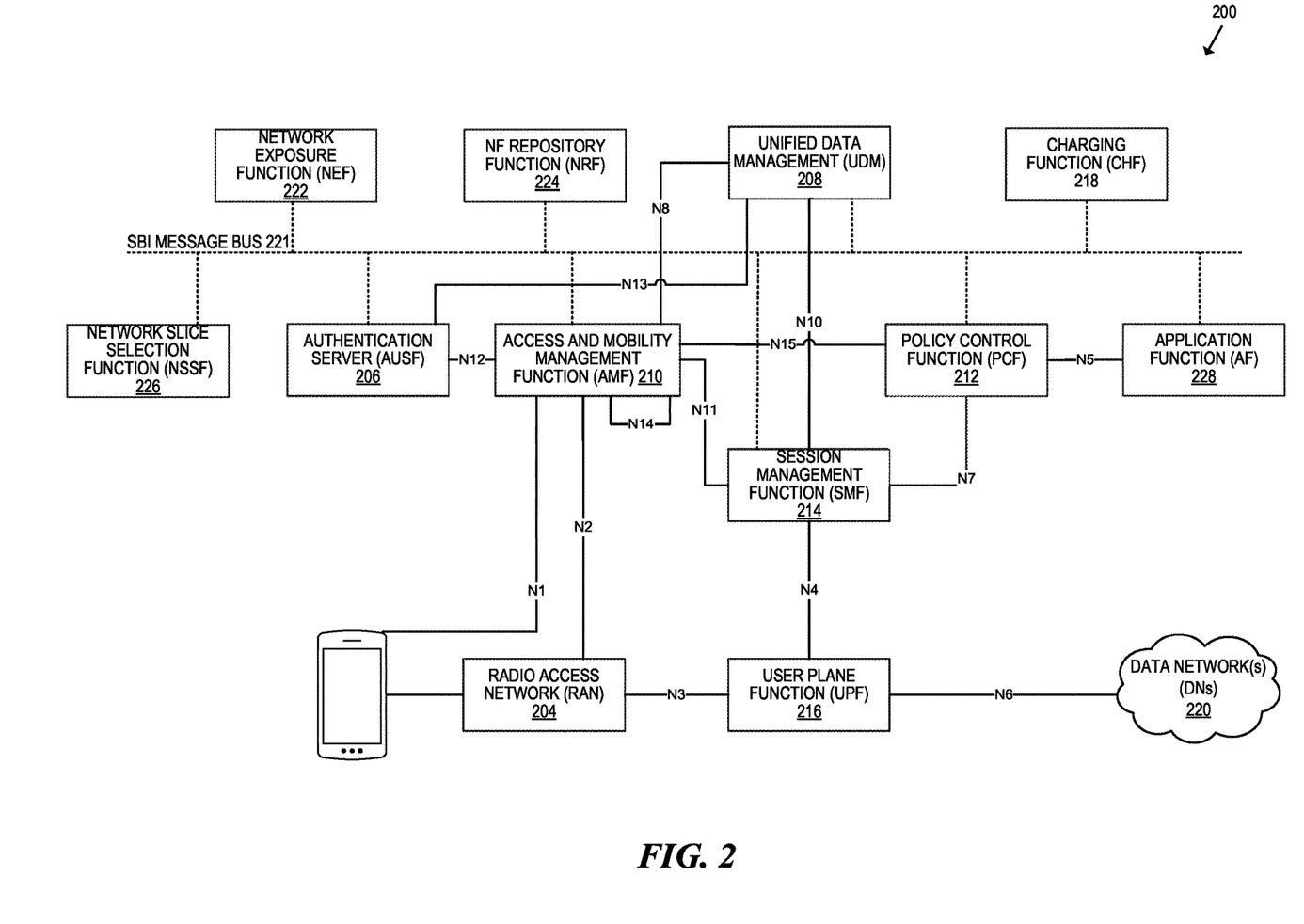
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (Afs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

System to Assess Network Performance for IMS Data Sessions

Figure 3:
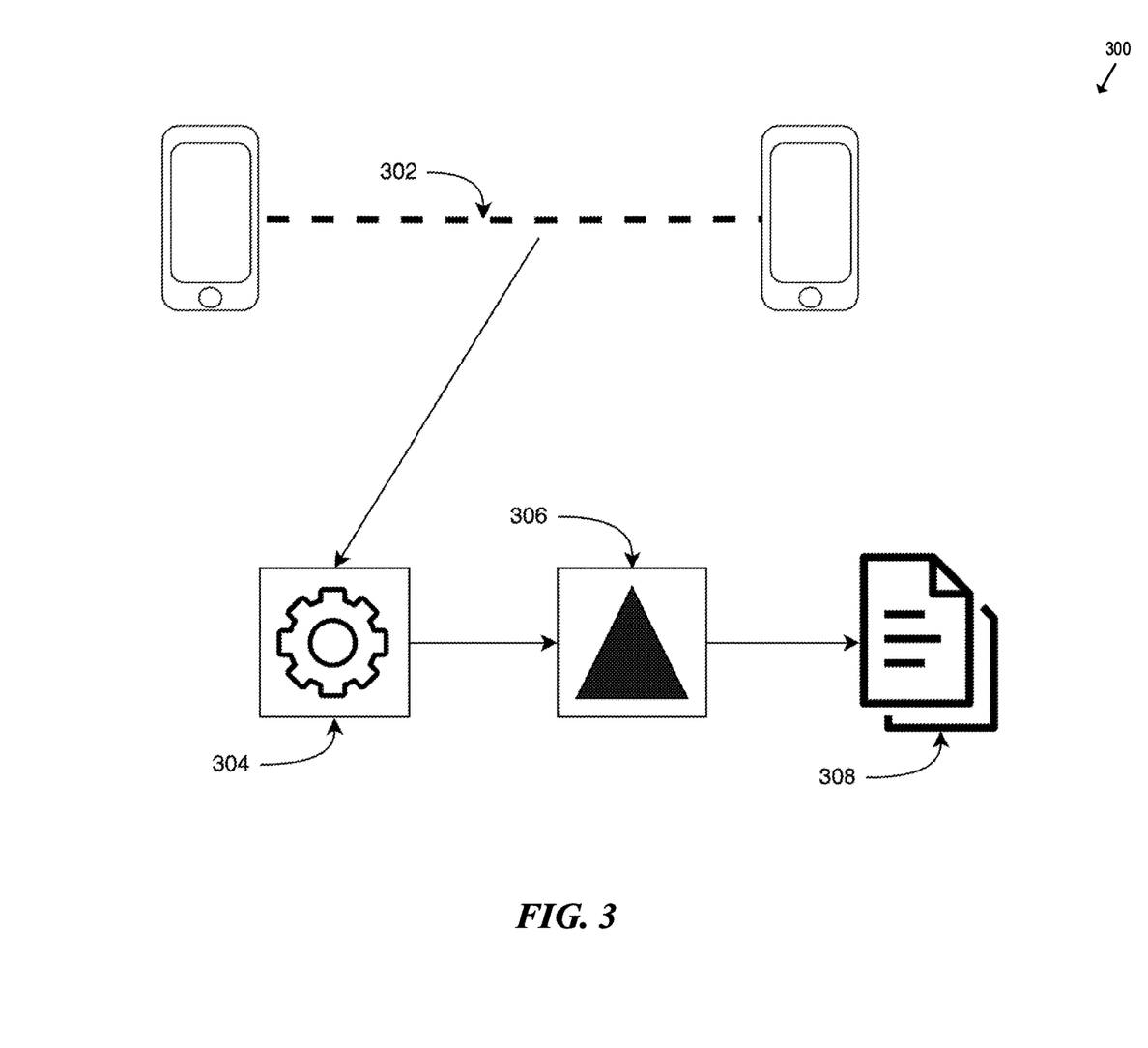
FIG. 3 is a block diagram that illustrates generating subjective quality ratings for Internet protocol multimedia subsystem (IMS) data sessions in real-time, according to some implementations.

FIG. 3 is a block diagram that illustrates generating subjective quality ratings for Internet protocol multimedia subsystem (IMS) data sessions, according to some implementations. The subjective ratings for IMS data sessions system 300 includes real-time telecommunications network data 302, trained model 304, subjective quality rating 306, and report 308. Real-time telecommunications network data 302 can include data from an active phone call between two UEs. The real-time telecommunications network data can include data measured by a network element at each of a plurality of measurement intervals during an IMS data session.

For example, the system includes real-time telecommunications network data 302, which can be received through real-time telecommunications network data. The real-time telecommunications network data can include data measured by a network element (e.g., a base station) at regular measurement intervals during an IMS data session.

The system can input the data in trained model 304. Trained model 304 can output the subjective quality rating 306 for each of the plurality of measurement intervals. The subjective quality rating 306 can be used to determine the quality of the network element. In some implementations, the subjective quality rating 306 can be a MOS, video quality metric (VQM), or can reflect attributes of the data session or real-time media that are similar to the attributes reflected by a MOS, VQM, or other metric corresponding to real-time media or the IMS data session. The trained model 304 can be trained to receive the real-time telecommunications network data 302 as an input, identify relevant network element attributes, and generate a subjective quality rating 306.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive network data measured at one interval of time or network data measured across multiple intervals. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as in generating a subjective quality rating based on the network data during an IMS data session at one interval of time or across multiple intervals. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes real-time telecommunications network data as input and a desired output, such as a subjective quality rating corresponding to one or more network elements during an IMS data session. A representation of a subjective quality rating can be provided to the model. Output from the model can be compared to the desired output for that subjective quality rating and, based on the comparison, the model can be modified, such as by changing weights between nodes of the neural network or parameters of the functions used at each node in the neural network (e.g., applying a loss function). After applying each of the subjective quality ratings in the training data and modifying the model in this manner, the model can be trained to evaluate new network elements to determine corresponding subjective quality ratings.

In some implementations, the system aggregates the output from the trained model 304 to generate a report 308 that includes performance score, where the performance score represents an aggregate of the subjective quality rating 306 for each of the measurement intervals during the data session. For example, the system can average all the quality ratings measured during a data session (e.g., during a video call or VoIP call). Averaging of the subjective quality rating 306 can reduce the impact of singular anomalous measurements of the telecommunications network data, and thus may better represent the overall quality of the data session than individual quality ratings. On the other hand, some implementations of the system employ non-averaged quality ratings or quality ratings averaged over short portions of a data session to detect transient quality issues.

The system can generate a report 308 that includes a performance score as an aggregate of the subjective quality rating 306 for each of the measurement intervals corresponding to the IMS data session. For example, the system generates a report 308 for a video call that includes the subjective quality rating 306 corresponding to the data session. Furthermore, report 308 generated by the system can be used to determine the quality of the video call.

The system can modify an attribute of the telecommunications network based on report 308 generated by the system or based on one or more subjective quality ratings 306 in order to improve the quality of IMS data sessions on the network. For example, a modification can be made, by the system, to one or more network nodes. The modification can be informed by the report. For example, the system can cause or recommend modifications to a UE, such as modifying encoding parameters. The system can cause modifications to the base station to adjust radio resource allocation (e.g., bandwidth or power) or modulation schemes to improve the quality of the radio link with the UE. The system can cause modifications to the serving gateway (S-GW) or the user plane function (UPF), such as modifications to traffic shaping or other parameters to alter the prioritization of voice traffic, or modifications that can reduce latency or packet loss. Additional modifications can include adjusting firewall rules or packet filtering in the border gateway function (BGF) or adjusting media transcoding parameters (e.g., codec selection or bit rate) in the media gateway (MGW). The system can also make modifications to routing in the interconnecting session border controller (I-SBC) to transmit packets on routes with better subjective quality ratings. For some types of modifications, the system can make the modification substantially in real-time during an IMS data session to improve the quality of the data session. Other types of modifications are made after a data session to improve the quality of subsequent data sessions, such as subsequent data sessions that originate from the same UE or subsequent data sessions that pass through at least some of the same network nodes.

Report 308 can also be used in ways that do not necessarily modify one or more attributes of the network. For example, report 308 generated by the system can be used to generate dashboards for internal or external reporting purposes. Report 308 can be used to perform anomaly detection to identify vulnerabilities or attempted exploits in the network. Report 308 can be used to perform voice quality data analysis and correction. Furthermore, the data gathered and generated by the system can be used in more advanced machine learning tasks (e.g., anomaly detection).

The system can be used in detecting and responding to an anomaly to mitigate negative consequences for the network. For example, the system can remove a device from the network or transmit instructions, based on the report, to a malfunctioning device to restart. Additionally, resources can be increased or decreased in accordance with metrics derived from the report.

The system can generate the subjective quality rating 306 by receiving communication logs from the network elements (e.g., nodes) and identifying the missing subjective quality ratings from each element. Based on the missing ratings, the system can generate a subjective quality rating 306 for each element associated with the communication logs that are missing the subjective quality ratings. By doing so, the system can improve the network quality based on the missing subjective quality ratings. For example, operation of a particular network node can be modified in real-time during a call based on a quality rating generated for the node. Furthermore, the system can confirm existing subjective quality ratings.

The system can generate a report 308 that includes a performance score as an aggregate of the subjective quality rating 306 for the real-time telecommunications network data. Report 308 can be used for presentation purposes or to inform decisions to alter the network or infrastructure. By generating 306 the report, the subjective quality rating 306 can be used to inform further decisions to improve network quality.

The system can perform anomaly detection based on report 308 by inputting report 308 into an anomaly detection algorithm that identifies unexpected subjective quality ratings. The algorithm can generate an average MOS corresponding to the real-time telecommunications network data by averaging the performance score at regular intervals. The algorithm can generate a threshold using the average MOS corresponding to the real-time telecommunications network data, and determine the baseline subjective quality rating (e.g., subjective quality rating 306) for the node based on the threshold. The system can generate an alert including the subjective quality rating 306 based on a determination that the subjective quality rating 306 does not exceed the threshold. By doing so, the system can ensure that network quality is optimized.

The system can detect anomalies based on report 308 by inputting report 308 into an anomaly detection algorithm that identifies subjective quality ratings that are unexpected. For example, the system can generate a threshold using RAN measurements other than MOS corresponding to the network element, such as VQMs or other measurements corresponding to real-time media. The system can then compare the subjective quality rating 306 to the threshold and, after determining that the subjective quality rating 306 exceeds the threshold, generate an alert. By generating an alert, the system can provide the necessary information to ensure that anomalies do not proceed undetected, which can lead to a degradation in network quality.

The system can also input report 308 into a recommendation algorithm that outputs a recommendation. By identifying a relevant recommendation, the system can provide the necessary steps to improve the subjective quality rating. Specifically, the system can provide recommendations that, when implemented, increase the subjective quality rating.

The system can output a subjective quality rating 306 by storing the first and second subjective quality ratings. The system can determine if the recommendation provided was implemented or successful based on the difference between the first and second subjective quality ratings. Specifically, if the first subjective quality rating (e.g., the subjective quality rating associated with the network element before the recommendation being identified) is less than the second subjective quality rating (e.g., the subjective quality rating associated with the network element after the recommendation is identified), the recommendation could have been implemented successfully. By determining if the recommendation is successful, the system can determine whether to transmit another recommendation.

Although implementations of the system are described herein with respect to generating and using subjective quality ratings, some implementations of the system can output alternative quality ratings based on the subjective quality rating. For example, the system can use similar techniques to evaluate potential packet drops correlated to audio quality on IMS real-time multi-media (e.g., a VoIP call or a video call). The alternative quality ratings generated by the system can be helpful in providing a comprehensive overview of the network quality or to identify network issues other than those that can be identified based on the subjective quality rating.

Figure 4:
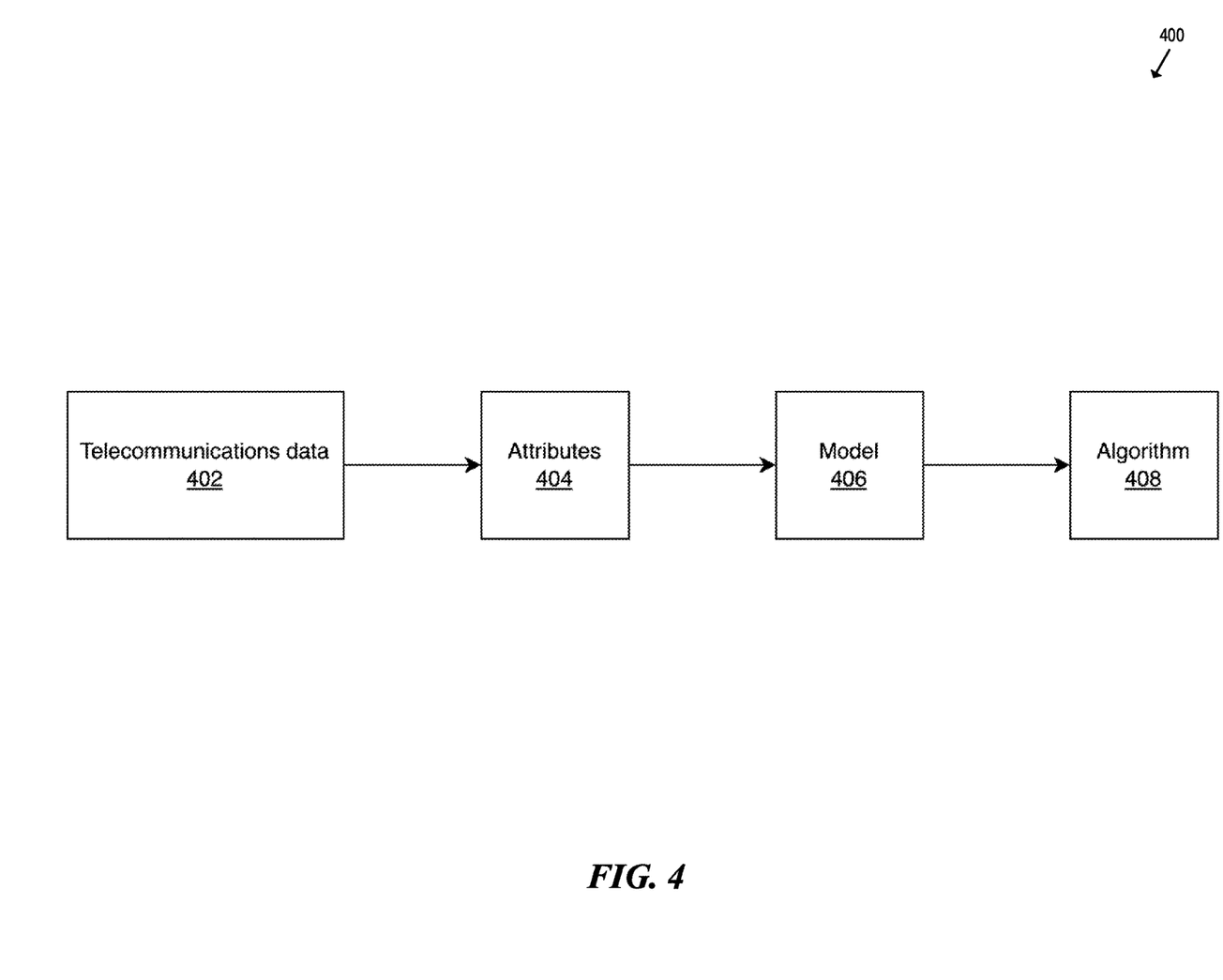
FIG. 4 is a block diagram that illustrates generating subjective quality ratings for Internet protocol multimedia subsystem (IMS) data sessions based on network element attributes, according to some implementations.

FIG. 4 is a block diagram that illustrates generating subjective quality ratings for Internet protocol multimedia subsystem (IMS) data sessions based on network element attributes, according to some implementations. Specifically, FIG. 4 shows the process of generating the algorithm used to generate subjective quality ratings for network elements in IMS data sessions based on network element attributes (e.g., network element attributes 404). After network element attributes 404 are extracted from the telecommunications data 402, system 400 inputs network element attributes 404 into a model 406, which generates algorithm 408 that can be used to generate subjective quality ratings for network elements in IMS data sessions. In some implementations, algorithm 408 can be included in model 406 such that model 406 receives attribute 404 as input and outputs the subjective quality rating corresponding to a network element.

In some implementations, network element attributes 404 include a latency metric. The telecommunications data 402 can include data from network elements that record the time delay experienced by a packet of data (e.g., the latency) when it is being transmitted from the source to the destination. High latency during an IMS data session can degrade call quality for subscribers. Furthermore, the latency metric in network element attributes 404 measured from network elements from telecommunications data 402 can be used to determine high latency, which can result in noticeable delays during a conversation, and, therefore, a reduction in the perceived network quality for the subscriber. For example, in generating network quality ratings using model 406 and algorithm 408, having a high latency can result in a lower network quality rating, and having a low latency can contribute to algorithm 408 generating higher network quality ratings as a result.

In some implementations, network element attributes include a jitter metric. The telecommunications data 402 can include data from elements that record the deviation in packet transmissions. The data received by the system from telecommunications data 402 can have a high jitter due to network congestion, or configuration errors. Having an echo during an IMS data session can degrade call quality for subscribers. For example, in generating network quality ratings using model 406 and algorithm 408, having higher jitter can cause algorithm 408 to generate lower network quality ratings, and having a lower jitter can contribute to algorithm 408 generating higher network quality ratings.

In some implementations, network element attributes 404 include a packet loss metric, which refers to instances where one or more packets of data in telecommunications data 402 fail to reach their destination or are "lost." A high packet loss during an IMS data session can degrade call quality for subscribers. A higher packet loss metric can indicate signal degradation, network congestion, or errors in network hardware. In a network quality rating context, packet loss can cause missing pieces of conversations or dropped calls, which can lead to a poor network quality experience and a lower network quality rating generated by algorithm 408.

In some implementations, network element attributes 404 include transcoding data. The telecommunications data 402 can include network element attributes 404 from network elements that represent a conversion of data from one format to another (e.g., metadata indicating that transcoding occurred). Poor transcoding during an IMS data session can degrade call quality for subscribers. For example, if telecommunications data 402 includes network element attributes 404, such as poor transcoding, model 406 can use information regarding the poor transcoding to predict a degradation in audio or video quality, which result in lower network quality ratings generated by algorithm 408.

In some implementations, network element attributes 404 include network elements that can measure echo data. The telecommunications data 402 can measure the reflection of sound arriving at the listener with a delay after the direct sound (e.g., the echo). Having an echo during an IMS data session can degrade call quality for subscribers. Network element attributes 404 can include high echo data due to feedback from the listener's microphone or issues with network latency. Echo can significantly degrade the perceived quality of a call, and thus can be factored into the subjective quality rating.

Model Integration within IMS Data Sessions

Figure 5:
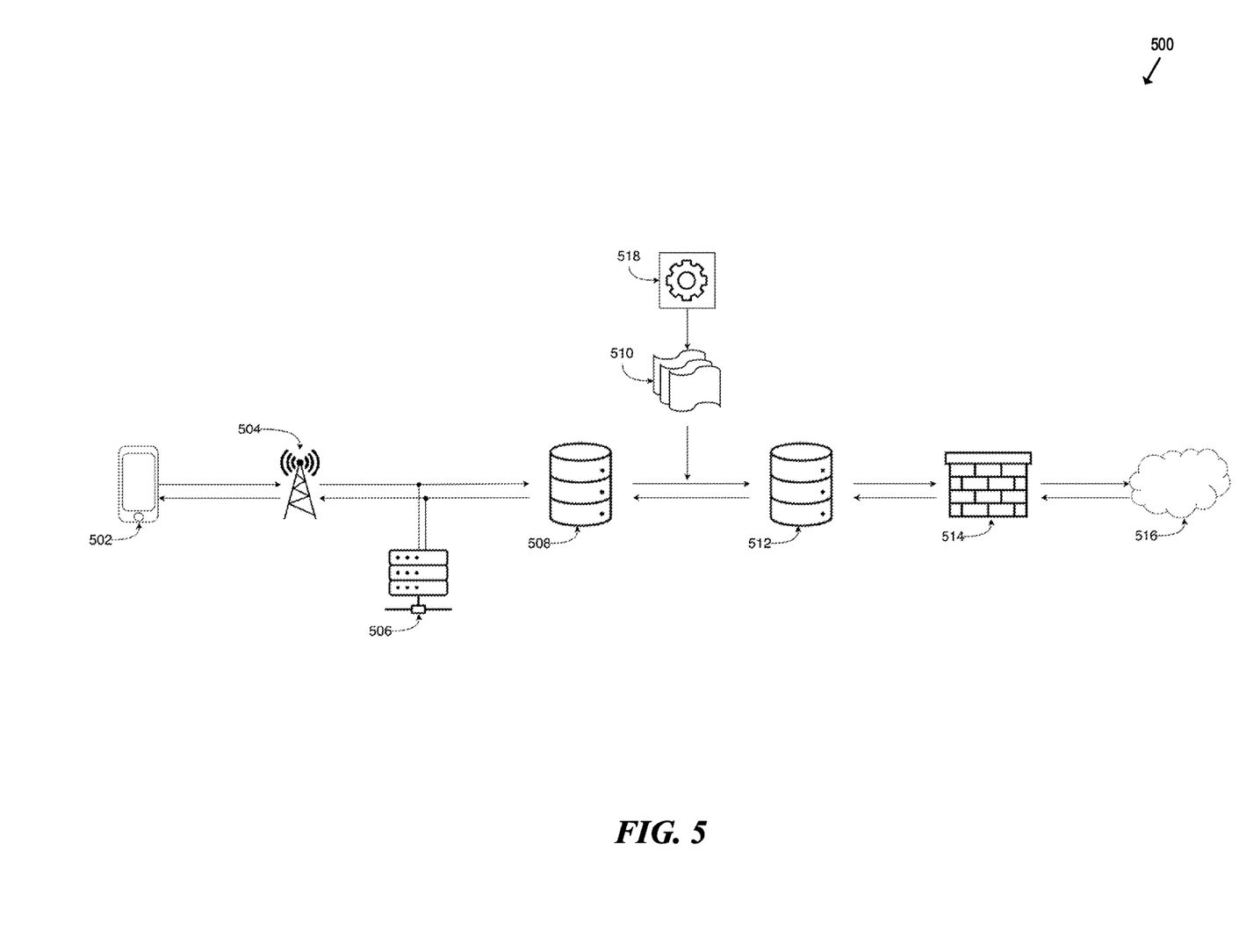
FIG. 5 is a block diagram that illustrates the model integration within IMS data sessions, according to some implementations.

FIG. 5 is a block diagram that illustrates the model integration within IMS data sessions, according to some implementations. System 500 includes UE 502, Radio Base Station 504, Serving gateway (S-GW)/User Plane Function (UPF) 506, Access Transfer Gateway (ATGW)/Border Gateway Function (BGF) 508, updates 510, Media gateway (MGW) 512, Interconnect Session Border Controller (I-SBC) 514, external network 516, and model 518.

UE 502 can provide a direct indication of the user's experience during an IMS data session. The rating generated by the system can help predict the quality of a call placed from the UE 502. This can lead to the system recommending changes to the UE 502, such as changing codecs, to enhance the quality of the IMS data session. In some implementations, the IMS data session is initiated by the UE 502.

Attributes gathered by the system and measured at the network element can be used to inform model 518. Subsequently, the algorithm can vary based on the associated network element. For example, UE 502 captures data about packet loss, delay, jitter, throughput traffic, etc. The radio base station 504 can include eNB/gNB, which can include measurements for signal strength, bit error rate, and handover success rate, and other traffic metrics which can impact the quality of service. Measuring these traffic metrics can influence the subjective quality rating generated by the system.

The S-GW/UPF 506 can include data corresponding to packet loss, delay, and throughput. The attributes measured by S-GW/UPF 506 can influence the subjective quality rating generated by the system. Additionally, the ATGW/BGF 508 can be used to measure packet loss, delay, jitter, throughput traffic, etc. MGW 512 can be used to measure the success rate of transcoding processes and any corresponding errors. The attributes measured by the ATGW/BGF 508 can influence the subjective quality rating generated by the system.

The I-SBC 514 can measure data relating to packet loss, delay, and throughput. Measuring these traffic metrics can influence the subjective quality rating generated by the system. Additionally, the external network 516 can measure latency, packet loss, jitter, and other attributes.

The attributes gathered during the IMS data session by the various network elements and nodes can be used by model 518 to generate subjective quality ratings and updates 510. Updates 510 can include updates to the network element (e.g., updates to a proxy-call session control function (P-CSCF)) based on the generated subjective quality ratings (e.g., a generated MOS).

Illustrative Flowchart

Figure 6:
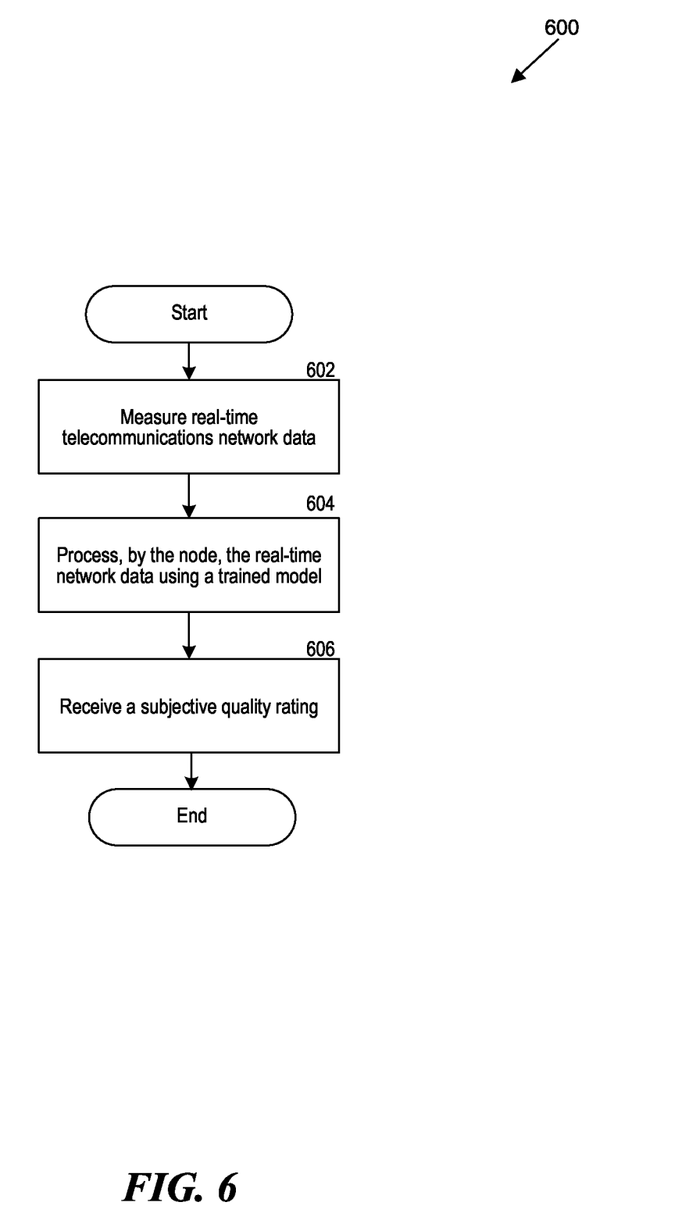
FIG. 6 is a flowchart illustrating a process for processing network data and receiving a subjective quality rating for use within IMS data sessions, according to some implementations.

FIG. 6 is a flowchart illustrating process 600 for processing network data and receiving a subjective quality rating for use within IMS data sessions, according to some implementations. A system can use process 600 (e.g., as implemented on one or more system components described above) in order to improve the quality of service during an IMS data session. Some implementations of the process 600 can be performed by a radio access or control plane node in a telecommunications network, during or after an IMS data session on the network. Other implementations of the process 600 can be performed by a computing device that may or may not be part of the telecommunications network, such as a user device, a device that communicates with the telecommunications network over a data network, etc.

At 602, the system receives telecommunications network data measured in real-time during a data session. For example, the system can measure, by a node in a telecommunications network, real-time telecommunications network data, wherein the real-time telecommunications network data includes data measured during an IMS data session conducted over the telecommunications network via the network node. Example telecommunications network data can include Quality of Service metrics, CDRs, error messages, user data, device information and location, routing data, and traffic data, including the number of packets transmitted and received. By measuring real-time telecommunications network data, the system can fill in missing key measurements in an IMS based on the real-time telecommunications network.

At 604, the system processes the real-time network data using a trained model. For example, the system can, during the IMS data session, process, by the node, the real-time network data using a trained model. For example, the node in the IMS can input the real-time network data into a trained model. The model can take the input network data and generate a subjective quality rating corresponding to the node in the network. For example, the P-CSCF is a node in an IMS that can measure real-time network data and input some or all of the network data (e.g., attributes including jitter, packet loss, transcoding, and echo) into a trained model. The P-CSCF can then generate a subjective quality rating using the model to ensure the presence of key measurements across nodes in an IMS. By processing the real-time network data using the trained model, the system can ensure the alignment of key measurements end-to-end in an IMS environment and across network elements from different vendors.

At 606, the system receives a subjective quality rating. For example, the system can receive, as output from the trained model, a subjective quality rating, wherein the subjective quality rating is usable to modify the performance of the node. For example, if the subjective quality rating consistently falls below a threshold, it could trigger adjustments in the network settings, resource allocation, or routing of traffic in an attempt to remedy the node and improve the quality of service.

Computer System

Figure 7:
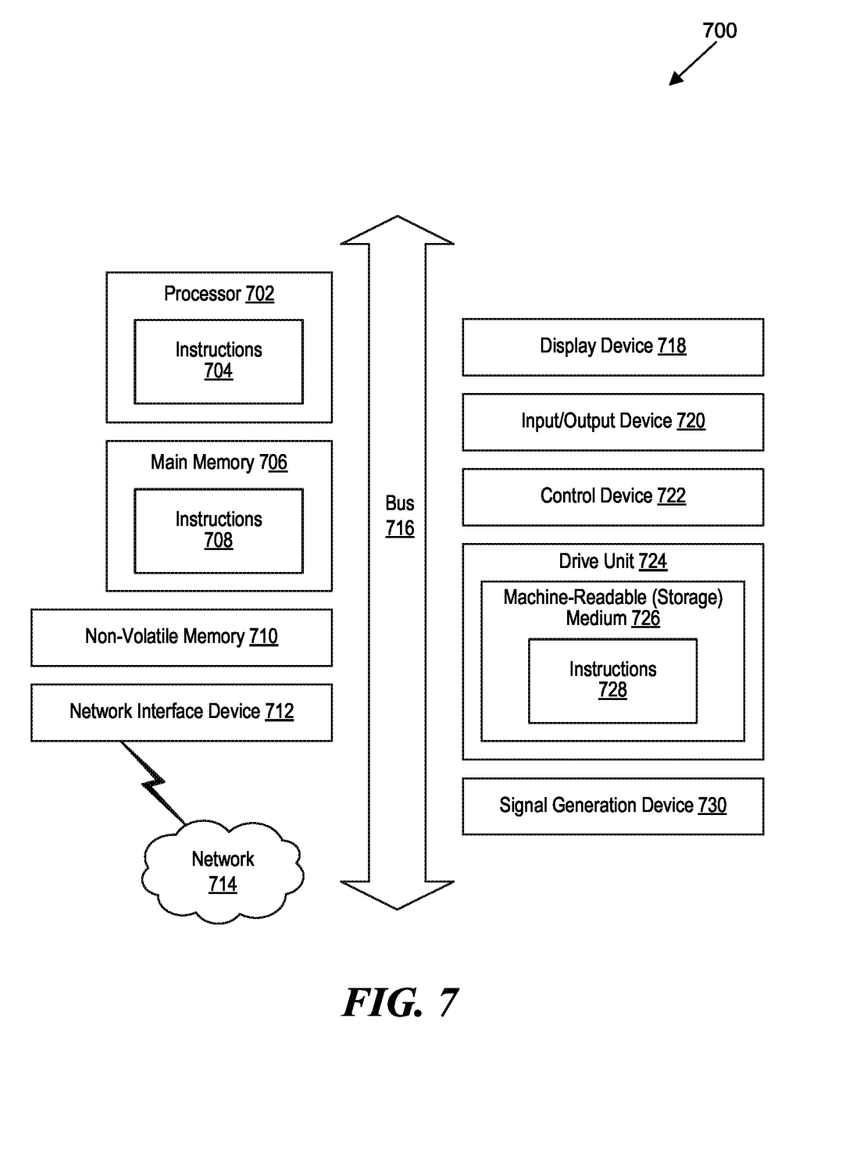
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system for assessing network performance during Internet protocol multimedia subsystem (IMS) data sessions, the system comprising:
   one or more processors; and
   one or more non-transitory, computer-readable media having instructions recorded thereon that when executed by the one or more processors cause operations comprising:
      receiving real-time telecommunications network data,
         wherein the real-time telecommunications network data includes data measured by a network element at each of a plurality of measurement intervals during an IMS data session, and
         wherein the IMS data session is conducted over a telecommunications network that includes the network element;
      inputting to a trained model, the real-time telecommunications network data;
      computing, using the trained model, a subjective quality rating for each of the plurality of measurement intervals by:
         identifying attributes in the real-time telecommunications network data, wherein the attributes include raw data at each of the plurality of measurement intervals during the IMS data session; and using the attributes as well as data from one or more similar IMS data sessions to determine a subjective quality rating;

receiving, as output from the trained model, the subjective quality rating for each of the plurality of measurement intervals;

generating a performance score by aggregating the output from the trained model from each of the plurality of measurement intervals during the IMS data session;

generating a report including the performance score; and modifying an attribute of the telecommunications network based on the report.

2. The system of claim 1, wherein the attribute of the telecommunications network comprises at least one of a bandwidth attribute or a routing attribute, wherein the bandwidth attribute includes a percentage representing allowable bandwidth corresponding to one or more network elements, and wherein the routing attribute includes a percentage representing one or more routes for traffic passing through the one or more network elements take.

3. The system of claim 1, wherein modifying the attribute of the telecommunications network based on the report comprises:

identifying an adjustable parameter associated with the telecommunications network, wherein the adjustable parameter modifies bandwidth or routing of the telecommunications network; and updating the adjustable parameter based on the attribute.

4. The system of claim 1, wherein receiving the real-time telecommunications network data further comprises:

identifying, using the network element at each of the plurality of measurement intervals, network element attributes corresponding to the network element, wherein the network element at each of the plurality of measurement intervals, assesses network performance by measuring the network element attributes; and generating an estimated subjective quality rating using the network element attributes corresponding to the network element.

5. The system of claim 4, wherein the network element attributes include one or more of: signal strength, latency, jitter, or packet loss.

6. A method for generating subjective quality ratings for IMS data sessions in real-time, the method comprising:

measuring, by a node in a telecommunications network, real-time telecommunications network data, wherein the real-time telecommunications network data includes data measured during an IMS data session conducted over the telecommunications network via the node;

during the IMS data session, processing, by the node, the real-time telecommunications network data using a trained model;

computing, by the trained model, a subjective quality rating by:

identifying attributes in the real-time telecommunications network data, wherein the attributes include raw data from the IMS data session; and using the attributes as well as data from one or more similar IMS data sessions to determine the subjective quality rating;

receiving, as output from the trained model, the subjective quality rating, wherein the subjective quality rating is usable to modify performance of the node; and generating a file including the subjective quality rating for use by the node in the telecommunications network.

7. The method of claim 6, wherein the trained model can be used to generate the subjective quality ratings by:

receiving communication logs from a plurality of nodes;

identifying missing subjective quality ratings from each node in the plurality of nodes; and generating the subjective quality rating for each node associated with the communication logs that are missing the subjective quality ratings.

8. The method of claim 6, further comprising generating a report including a performance score as an aggregate of the subjective quality rating for the real-time telecommunications network data.

9. The method of claim 8, further comprising performing anomaly detection based on the report by inputting the report into an anomaly detection algorithm which identifies unexpected subjective quality ratings by:

establishing a baseline subjective quality rating for a network element by:

generating an average video quality metric (VQM) corresponding to the real-time telecommunications network data by averaging the performance score at regular intervals;

generating a threshold using the average VQM corresponding to the real-time telecommunications network data; and determining the baseline subjective quality rating for the node based on the threshold;

determining that the subjective quality rating exceeds the threshold; and generating an alert including the subjective quality rating.

10. The method of claim 8, further comprising performing anomaly detection based on the report by inputting the report into an anomaly detection algorithm which identifies subjective quality ratings that are unexpected by:

establishing a baseline subjective quality rating for a network element by:

generating a threshold using radio access network (RAN) measurements other than VQM corresponding to the network element;

determining that the subjective quality rating exceeds the threshold; and generating an alert including the subjective quality rating and the RAN measurements corresponding to the network element.

11. The method of claim 8, further comprising, inputting the report into a recommendation algorithm that outputs a recommendation, wherein the recommendation, when implemented, increases the subjective quality rating.

12. The method of claim 11, further comprising, outputting a subjective quality rating progression by:

storing a first subjective quality rating at a first time;

implementing the recommendation;

storing a second subjective quality rating at a second time after the first time elapses and after implementing the recommendation;

generating a quality rating difference, wherein the quality rating difference is a difference between the second subjective quality rating at the second time and the first subjective quality rating at the first time; and outputting the quality rating difference.

13. The method of claim 6, further comprising, outputting an alternative quality rating based on the subjective quality rating.

14. The method of claim 13, wherein the alternative quality rating is potential packet drops wherein the potential packet drops are correlated to audio quality.

15. The method of claim 6, wherein the trained model further comprises:
   a model trained by:
      receiving training data,
         wherein the training data includes a plurality of subjective quality ratings from a set of network performance assessors; and
      generating the trained model by training a machine learning model using the training data,
         wherein the trained model outputs the subjective quality rating.

16. One or more non-transitory, computer-readable media comprising instructions recorded thereon that when executed by one or more processors causes operations comprising:
   receiving real-time telecommunications network data,
      wherein the real-time telecommunications network data includes data measured by a network element at each of a plurality of measurement intervals during an IMS data session, and
      wherein the IMS data session is conducted over a telecommunications network that includes the network element;
   inputting to a trained model, the real-time telecommunications network data;
   computing, using the trained model, a subjective quality rating for each of the plurality of measurement intervals by:
      identifying attributes in the real-time telecommunications network data, wherein the attributes include raw data at each of the plurality of measurement intervals during the IMS data session; and
      using the attributes as well as data from one or more similar IMS data sessions to determine the subjective quality rating;
   receiving, as output from the trained model, the subjective quality rating for each of the plurality of measurement intervals;
   generating a performance score by aggregating the output from the trained model from each of the plurality of measurement intervals during the IMS data session;
   generating a file including the performance score; and
   modifying an attribute of the telecommunications network based on the file.

17. The one or more non-transitory, computer-readable media of claim 16, wherein receiving the real-time telecommunications network data further comprises:
   identifying, using the network element at each of the plurality of measurement intervals, network element attributes corresponding to the network element,
   wherein the network element at each of the plurality of measurement intervals, assesses network performance by measuring the network element attributes; and
   generating an estimated subjective quality rating using packet loss and jitter associated with the network element.

18. The one or more non-transitory, computer-readable media of claim 16, further comprising performing anomaly detection based on the file by inputting the file into an anomaly detection algorithm which identifies unexpected subjective quality ratings by:
   establishing a baseline subjective quality rating for the network element by:
      generating an average MOS corresponding to the real-time telecommunications network data by averaging the performance score at regular intervals;
      generating a threshold using the average MOS corresponding to the real-time telecommunications network data; and
      determining the baseline subjective quality rating for the network element based on the threshold;
   determining that the subjective quality rating exceeds the threshold; and
   generating an alert including the subjective quality rating.

19. The one or more non-transitory, computer-readable media of claim 16, further comprising performing anomaly detection based on the file by inputting the file into an anomaly detection algorithm which identifies subjective quality ratings that are unexpected by:
   establishing a baseline subjective quality rating for a network element by:
      generating a threshold using radio access network (RAN) measurements other than MOS corresponding to the network element;
   determining that the subjective quality rating exceeds the threshold; and
   generating an alert including the subjective quality rating and the RAN measurements corresponding to the network element.

20. The one or more non-transitory, computer-readable media of claim 16, further comprising, inputting the file into a recommendation algorithm that outputs a recommendation, wherein the recommendation, when implemented, increases the subjective quality rating.

* * * * *